United States Patent [19]
Lin

[11] Patent Number: 5,839,195
[45] Date of Patent: Nov. 24, 1998

[54] GARDENING SHEARS

[76] Inventor: Yu-Tang Lin, No. 21, Wan Feng Lane, Wan Feng Village, Fu Hsing Hsian, Chang Hua Hsien, Taiwan

[21] Appl. No.: 840,581

[22] Filed: Apr. 22, 1997

[51] Int. Cl.[6] .................................................. B26B 13/00
[52] U.S. Cl. ................................................ 30/250; 30/249
[58] Field of Search .............................. 30/244, 245, 246, 30/249, 250, 186, 187, 188, 189, 190

[56] References Cited

U.S. PATENT DOCUMENTS

| | | | |
|---|---|---|---|
| 764,430 | 7/1904 | Crosby | 30/249 |
| 993,646 | 5/1911 | Burkett | 30/250 |
| 4,696,107 | 9/1987 | Held | 30/246 |
| 5,159,757 | 11/1992 | Weid et al. | 30/249 |
| 5,634,276 | 6/1997 | Lin | 30/249 |

*Primary Examiner*—Hwei-Siu Payer
*Attorney, Agent, or Firm*—Browdy and Neimark

[57] ABSTRACT

A gardening shears consists of a fixed jaw, a movable jaw fastened pivotally with the fixed jaw and provided with a blade opposite to the fixed jaw, a braking member fastened pivotally with the fixed jaw and provided with a slide slot in which a pivoting member is capable of moving back and forth so as to actuate the movable jaw, and two handles fastened respectively with the fixed jaw and the braking member. As one of the two handles is moved in the direction away from another one of the two handles, the pivoting member is caused to relocated in the slide slot of the braking member so as to bring about a desired change in the length of the arm of application to make the pruning job easier.

3 Claims, 4 Drawing Sheets

Figure 1:
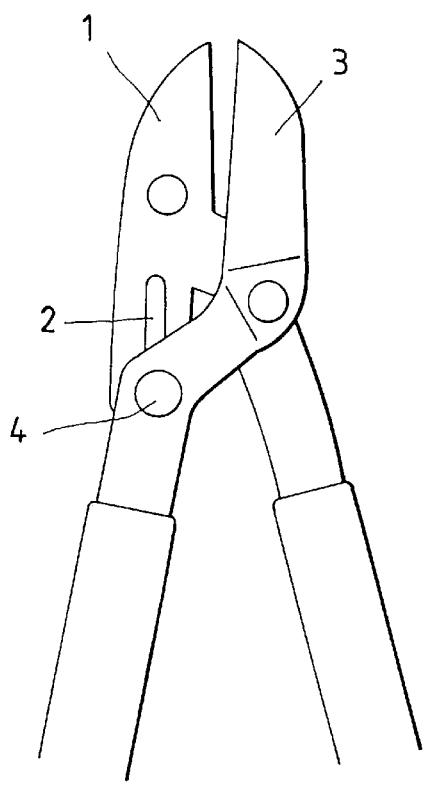
Figure 2:
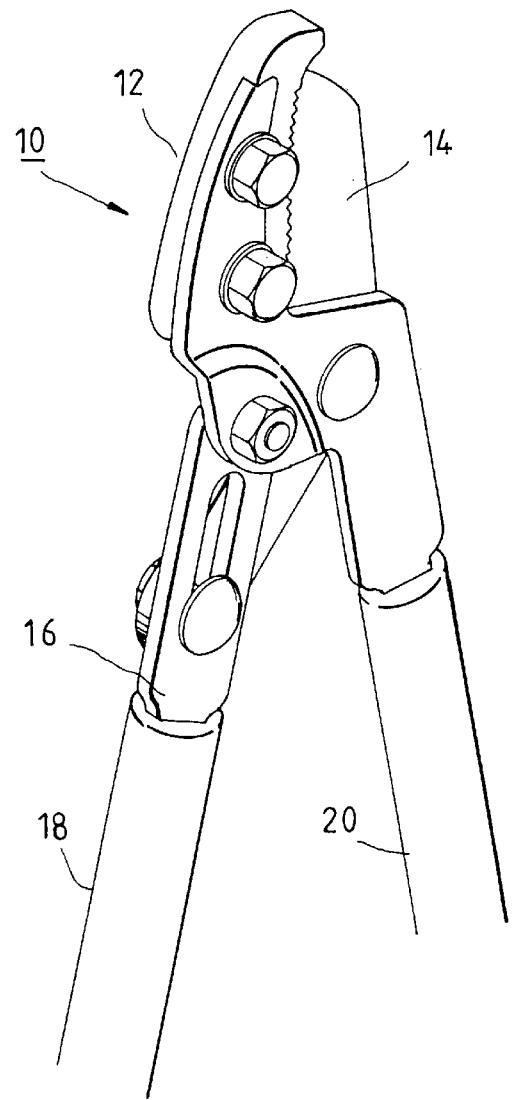
Figure 3:
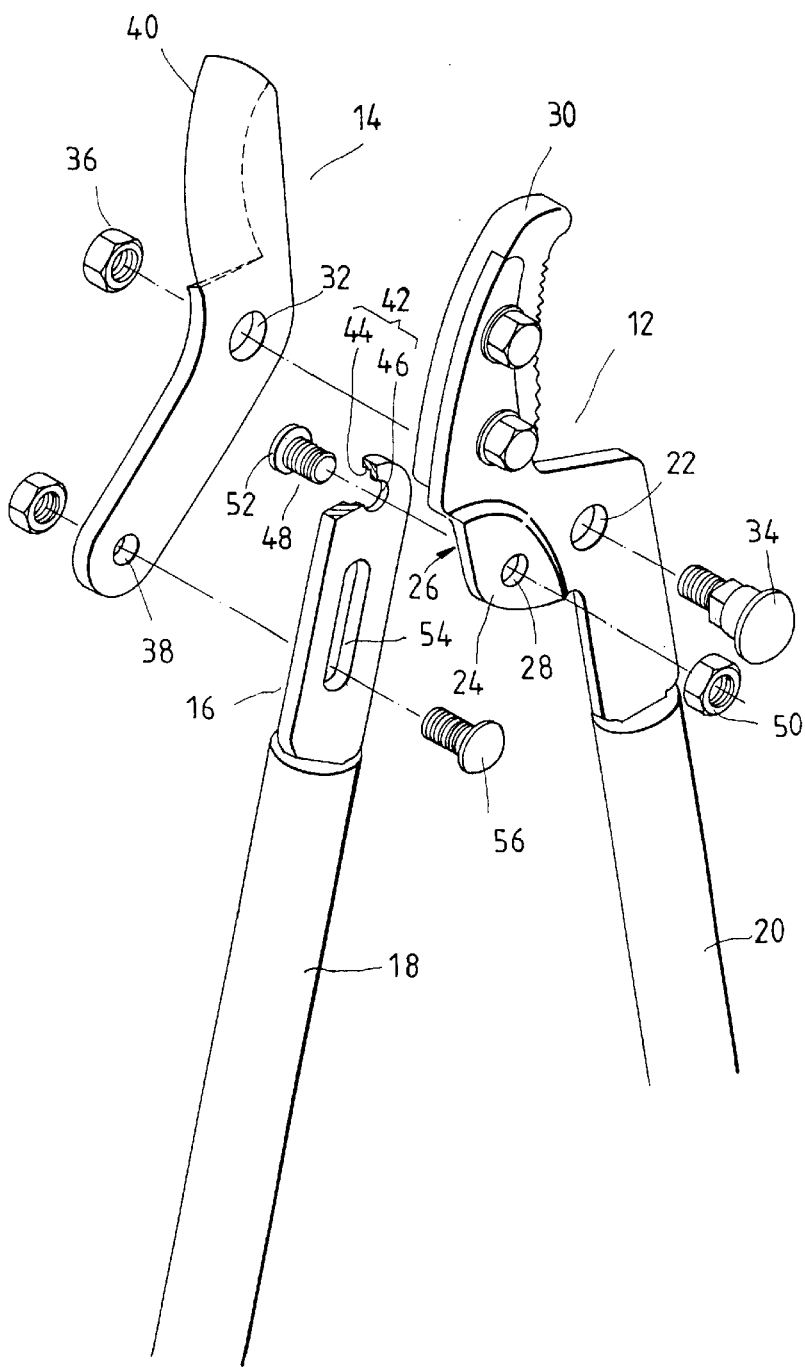
Figure 4:
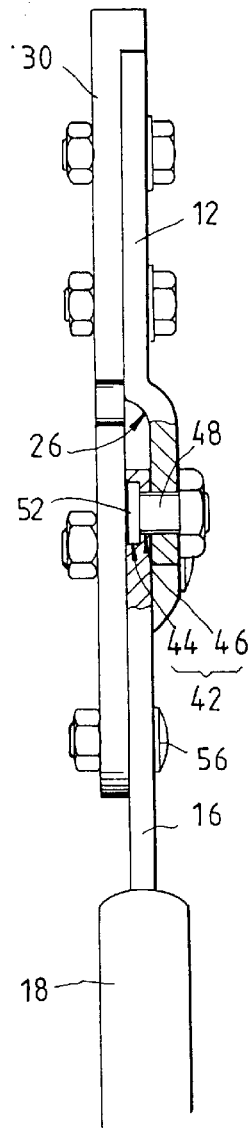
Figure 5:
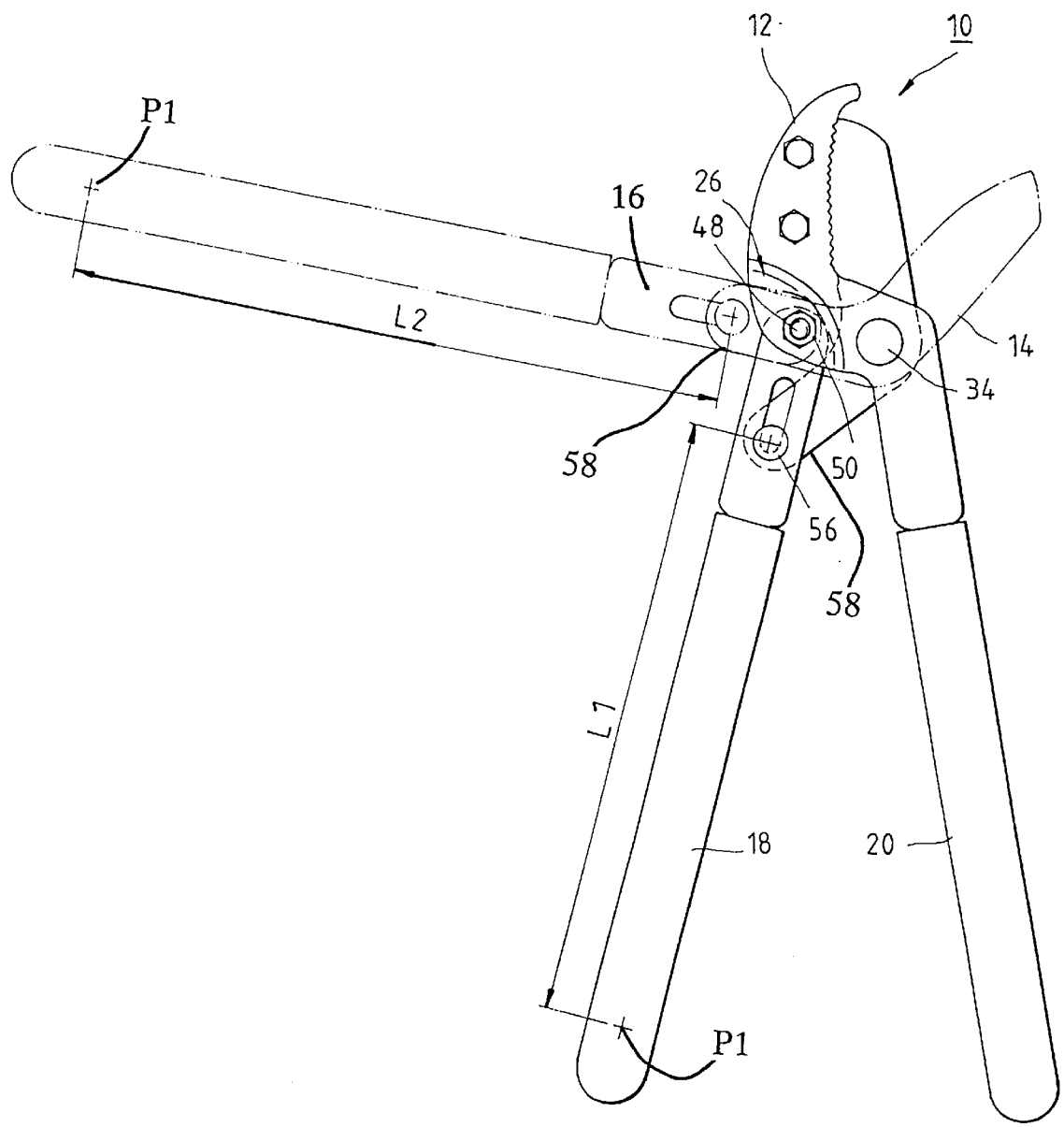
Figure 6:
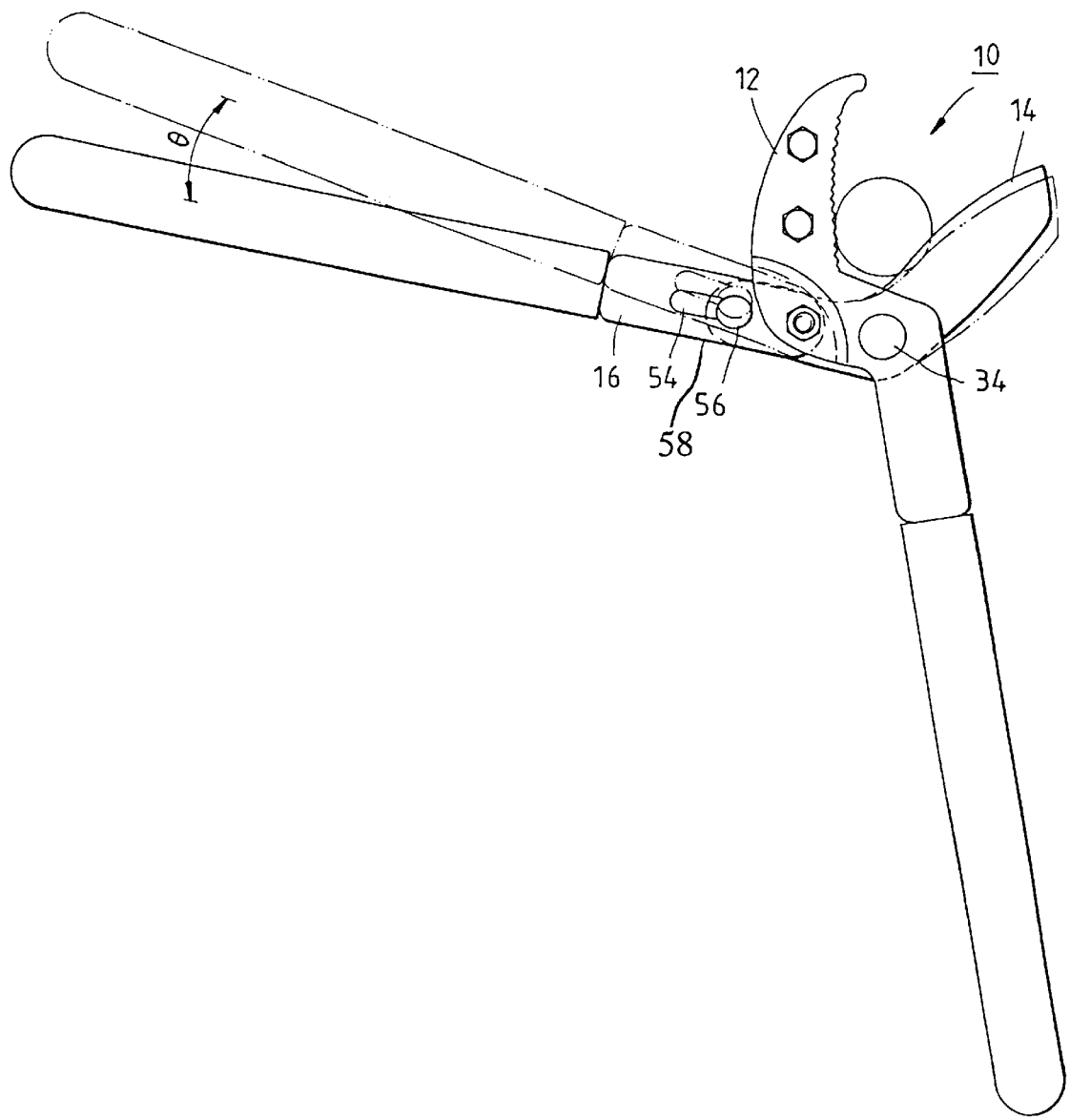

GARDENING SHEARS

FIELD OF THE INVENTION

The present invention relates generally to a shears, and more particularly to a gardening shears.

BACKGROUND OF THE INVENTION

The conventional gardening shears are generally provided with relatively long handles to facilitate the pruning of the garden plants. However, the gardening shears with the long handles are not necessarily efficient in view of the fact that the long handles add an additional weight to the shears, and that the long handles can hamper the pruning motion to a certain extent.

As shown in FIG. 1, a gardening shears of the prior art consists of blades 1 and 3. The blade 1 is provided at one end thereof with a slide slot 2 while the blade 3 is provided with a linking member 4 capable of moving back and forth in the slide slot 2 at such time when the blade 3 is moved in relation to the blade 1. Such a prior art gardening shears as described above is defective in design in that the length of arm of application of the gardening shears can not be effectively increased so as to make the pruning job easier.

SUMMARY OF THE INVENTION

The primary objective of the present invention is to provide an improved garden shears capable of increasing the length of arm of application effectively along with the pruning motion of the handles.

In keeping with the principle of the present invention, the foregoing objective of the present invention is attained by a gardening shears, which consists of a fixed jaw, a movable jaw fastened pivotally with the fixed jaw, a braking member fastened pivotally with the fixed jaw and provided with a slide slot to facilitate the reciprocating motion of a pivoting member along the direction of the longitudinal axis of the slide slot. The pivoting member is fastened pivotally with the movable jaw. Two handles are coupled with the fixed jaw and the braking member.

The foregoing objective, features and functions of the present invention will be more readily understood upon a thoughtful deliberation of the following detailed description of the embodiment of the present invention with reference to the accompanying drawings.

BRIEF DESCRIPTION OF THE DRAWINGS

FIG. 1 shows a perspective view of a gardening shears of the prior art.

FIG. 2 shows a perspective view of a gardening shears of the present invention.

FIG. 3 shows an exploded view of the gardening shears of the present invention.

FIG. 4 shows a partial sectional view of the gardening shears of the present invention.

FIG. 5 shows a schematic view of the present invention at work.

FIG. 6 shows another schematic view of the present invention at work.

DETAILED DESCRIPTION OF THE INVENTION

As shown in FIGS. 2–4, a gardening shears 10 of the embodiment of the present invention consists of a fixed jaw 12, a movable jaw 14 fastened pivotally with the fixed jaw 12, a braking member 16 fastened pivotally with the fixed jaw 12 and the movable jaw 14, and two handles 18 and 20 which are fastened respectively with the braking member 16 and the fixed jaw 12.

The fixed jaw 12 is provided with a first through hole 22, a curved portion 24 provided with a second through hole 28, an arcuate restriction portion 26 defined by the curved portion 24, and an anvil 30.

The movable jaw 14 is provided with a third through hole 32, a fourth through hole 38, and a blade 40 opposite to the anvil 30. The third through hole 32 is engaged with a bolt 34 which is in turn engaged with the first through hole 22 in conjunction with a nut 36 for fastening the movable jaw 14 with the fixed jaw 12.

The braking member 16 is provided at one end thereof with a pivoting hole 42 having a large diametrical portion 44 and a small diametrical portion 46. The pivoting hole 42 is engaged with a fastening bolt 48 for fastening pivotally the braking member 16 with the fixed jaw 12 in conjunction with a nut 50. The fastening bolt 48 is engaged with the pivoting hole 42 of the braking member 16 as well as the second through hole 28 of the fixed jaw 12 such that the head 52 of the fastening bolt 48 is located at the inner side of the large diametrical portion 44. Located in the center of the braking member 16 is a slide slot 54 in which a pivoting member 56 is movably received in such a manner that the pivoting member 56 is engaged with the fourth through hole 38. The pivoting member 56 is a bolt.

The handles 18 and 20 are fastened respectively with the braking member 16 and the fixed jaw 12.

As illustrated in FIG. 5, when the handles 18 and 20 are moved in the opposite directions towards each other, the length of the arm of application is the distance L1 between the point of application P1 of the handle 18 and the bolt 56. As the handle 18 is moved in the direction away from the handle 20, the bolt 56 is caused to move upwards in the slide slot 54. As the handle 18 is kept moving away from the handle 20 to such an extent that the braking member 16 and one end 58 of the movable jaw 14 are aligned, the bolt 56 is located at the top end of the slide slot 54 of the braking member 16. As a result, the length of the arm of application is increased to L2. On the other hand, if the handle 18 is moved in the direction toward the handle 20, the length of the arm of application is decreased. When the gardening shears 10 of the present invention is at work, the motion of the movable jaw 14 is not interfered with, thanks to the head 52 which is hidden by the large diametrical portion 44.

As illustrated in FIG. 6, the braking member 16 can be caused to turn further upwards, as indicated by an angle $\theta$, after the braking member 16 is aligned with one end 58 of the movable jaw 14. Such an additional upward swing of the braking member 16 is attained by the further moving of the handle 18 away from the handle 20 after the braking member 16 and one end 58 of the movable jaw 14 are aligned. As the braking member 16 is caused to move an additional angle of $\theta$, the outer edge of the top end of the braking member 16 engageable the restriction portion 26, thereby enabling the fixed jaw 12 and the movable jaw 14 to receive therebetween a twig of a greater diameter.

The gardening shears 10 of the present invention makes the pruning job easy by virtue of the fact that the maximum moment of force is brought about easily by the operator's arm force exerting on the handle 18 at such time when the length of the arm of application of the gardening shears 10 has reached the magnitude of L2, as described above with reference to FIG. 5. It must be noted here that the maximum moment of force is attained by the length of arm of application L2 which is multiplied by the operator's arm force exerting on the handle 18.

The embodiment of the present invention described above is to be deemed as merely illustrative and not restrictive. Accordingly, the present invention may be embodied in other specific forms without deviating from the spirit thereof. For example, the restriction portion 26 of the fixed jaw 12 of the present invention may be of a profile other than an arcuate profile, as long as the restriction portion 26 is capable of confining the deflection angle of the braking member 16. The present invention is therefore to be limited only by the scopes of the following appended claims.

What is claimed is:

1. A gardening shears comprising:

a fixed jaw;

a movable jaw fastened pivotally with said fixed jaw and provided with a blade opposite to said fixed jaw;

a braking member fastened pivotally at one end thereof with said fixed jaw and provided with a slide slot of a size permitting a pivoting member to slide back and forth, said pivoting member being fastened at one end thereof with said movable jaw; and two handle fastened respectively at one end thereof with said fixed jaw and said braking member, wherein said fixed law is provided with a restriction portion for confining a deflection angle of said braking member.

2. The gardening shears as defined in claim 1, wherein said restriction portion is located in a recess of one side of said fixed jaw; and wherein said braking member is engageable at one end thereof by said restriction portion of said fixed jaw.

3. The gardening shears as defined in claim 1, wherein said fixed jaw is provided with an anvil fastened therewith such that said anvil is opposite to said blade of said movable jaw.

* * * * *